United States Patent [19]

Evans et al.

[11] 4,200,262
[45] Apr. 29, 1980

[54] METHOD AND APPARATUS FOR REMOVING COMBUSTIBLE MATERIAL FROM METAL SCRAP

[75] Inventors: Marvin Evans; David H. Miller, both of Milwaukee, Wis.

[73] Assignee: College Research Corporation, Butler, Wis.

[21] Appl. No.: 923,018

[22] Filed: Jul. 10, 1978

[51] Int. Cl.² .................... F27B 7/04; F27B 7/08
[52] U.S. Cl. .................................. 266/44; 266/87; 266/173; 266/901; 432/42; 432/107
[58] Field of Search ............. 266/87, 173, 177, 190, 266/205, 213, 255, 901, 44; 432/42, 43, 107, 112–114, 110

[56] References Cited

U.S. PATENT DOCUMENTS

| | | | |
|---|---|---|---|
| 2,860,080 | 11/1958 | Wanamaker et al. | 266/173 |
| 3,233,982 | 2/1966 | Maginn, Jr. | 432/107 |
| 3,346,417 | 10/1967 | Ehrlich | 266/901 |
| 3,355,156 | 11/1967 | Hanna | 432/42 |
| 3,779,532 | 12/1973 | Mescher | 266/87 |
| 3,802,847 | 4/1974 | Hara et al. | 266/173 |
| 4,125,437 | 11/1978 | Bacon | 432/107 |

Primary Examiner—L. Dewayne Rutledge
Assistant Examiner—Peter K. Skiff
Attorney, Agent, or Firm—Andrus, Sceales, Starke & Sawall

[57] ABSTRACT

A method and apparatus for removing combustible material from metal scrap. The apparatus includes an inclined rotating retort, and scrap metal containing combustible material is fed into one end of the retort and as the scrap moves through the retort the combustible material is burned from the scrap. The retort is spaced within an outer refractory housing to provide an annular chamber therebetween, and the chamber is divided into two or more zones. Located within each zone is a fuel burner and a cooling air inlet. The temperature is sensed in each zone, and if the temperature falls below a preset minimum, the burner in that zone is operated, while if the temperature in the zone exceeds a pre-set maximum, cooling air is supplied to that zone to thereby maintain the temperature of the scrap metal within predetermined limits.

5 Claims, 3 Drawing Figures

METHOD AND APPARATUS FOR REMOVING COMBUSTIBLE MATERIAL FROM METAL SCRAP

BACKGROUND OF THE INVENTION

It is economically desirable to reclaim scrap metal, such as turnings, chips, shearings, punchings, borings, gates, risers, and the like, so that the reclaimed scrap can be used as melting stock or used in chemical processes, or briquetted for use as a charge material in foundry practice.

The use of metal scrap has certain drawbacks in that the scrap is small dimensionally and is normally coated with oil. If the oil coated scrap is used as melting stock, the oil will be combusted during the melting process and the resulting smoke is difficult to control in the foundry. Furthermore, the oil coating can cause slag problems in the melt. If the oil coated metal scrap is briquetted, any residual oil can have an adverse effect on the bond between the scrap particles in the briquette.

Because of this, it is common practice to remove the oil and other organic contaminants from the metal scrap by passing the scrap through an inclined, heated retort or drum. The contaminated scrap is introduced into the upper end of the retort, and as the scrap is conveyed downwardly to the lower end the combustible materials are heated and vaporized.

In one method, sufficient heat is supplied to merely vaporize the moisture, oil or other organic contaminants, and the vapors are then delivered to an afterburner where the vapors are burned.

In another commonly used method, controlled, partial combustion of the oil is effected in the retort in which a sefl-supporting flame is maintained in at least a portion of the length of the retort. With this system, it is necessary to exercise close temperature control within the retort in order to prevent oxidation, fusing or melting of the metal scrap. In the past, attempts have been made to provide temperature control for the metal scrap by introducing water into the retort when the temperature exceeds a pre-determined maximum, as suggested by U.S. Pat. No. 3,767,179. However, it is difficult to accurately control the amount of water added to maintain the scrap at a precise temperature.

SUMMARY OF THE INVENTION

The invention is directed to a method and apparatus for removing combustible material from the metal scrap. In accordance with the invention, the apparatus includes an inclined rotating retort, and scrap material, coated with combustible substances, is fed into one end of the retort. As the scrap moves through the retort the combustible substances are vaporized from the scrap. Spaced outwardly from the retort is an outer refractory housing, and the chamber between the retort and the housing is divided into two or more longitudinal zones. A fuel burner and an air supply conduit are located within each zone.

The temperature in each zone is sensed by a thermocouple, and if the temperature falls below a pre-set minimum, the burner in that zone is operated to supply heat to the zone. On the other hand, if the temperature in the zone exceeds a preset maximum, cooling air is supplied to that zone to thereby maintain the temperature of the retort and the scrap therein within predetermined limits.

The method of the invention provides a controlled partial combustion of the combustible material in the retort in which a self-supporting flame is maintained in at least a portion of the length of the retort. By maintaining the temperatures within predetermined limits, oxidation of the metal scrap is prevented, as well as possible melting or fusing of the scrap.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
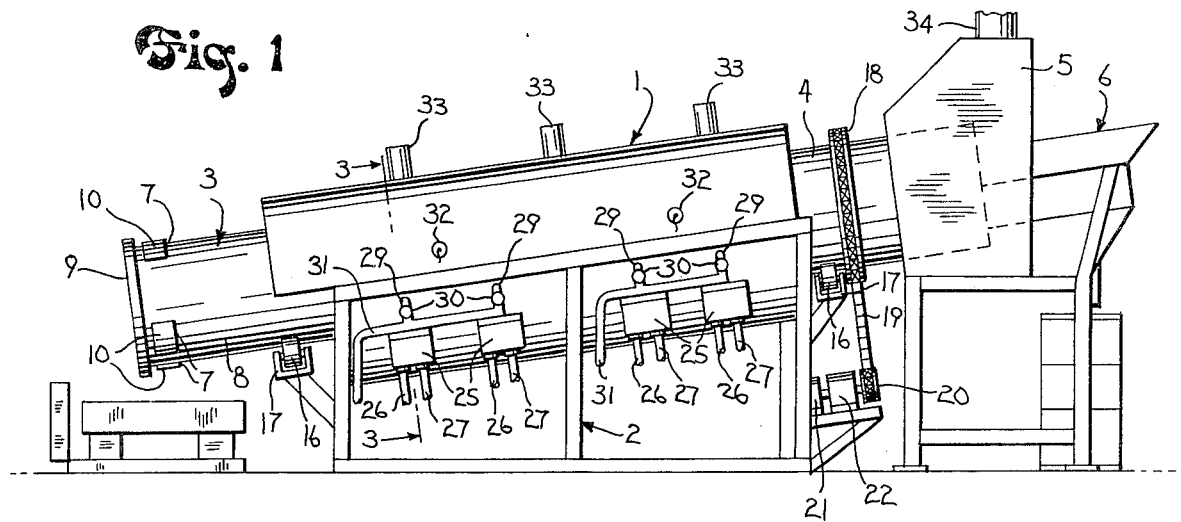
FIG. 1 is a side elevation of the apparatus of the invention with parts broken away in section.
Figure 2:
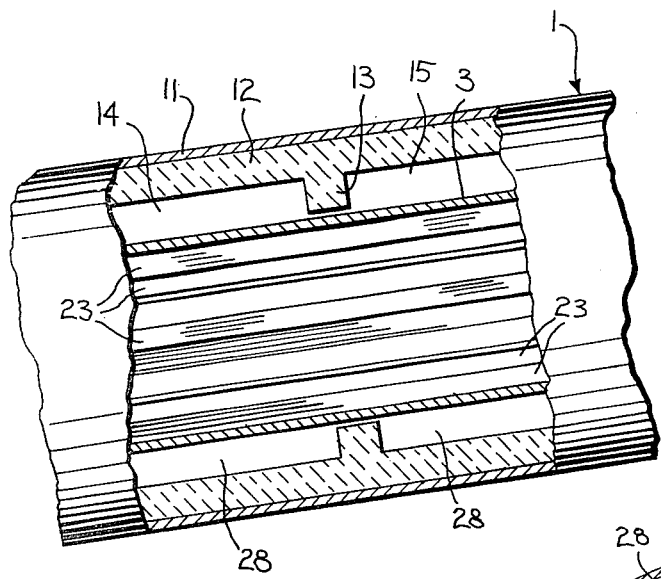
FIG. 2 is an enlarged fragmentary side elevation with parts broken away.

FIG. 1 illustrates an apparatus for removing combustibles from metal scrap or other non-combustible materials and comprises an outer shell or furnace 1 which is supported on a frame 2. Mounted for rotation within the shell 1 is a generally cylindrical retort or drum 3 having its axis inclined with respect to the horizontal.

The upper inlet end 4 of the retort 3 projects beyond the shell 1 and is enclosed by a hood 5. A feeding mechanism, indicated by 6, serves to feed the scrap material into the inlet end 4 of the retort. As the retort rotates the scrap material is conveyed downwardly and is discharged through a series of openings 7 located in the lower end portion 8 of the retort which projects outwardly beyond the shell 1. The lower end of the retort is enclosed by a plate 9, and the discharge openings 7 are located in the cylindrical wall of the retort 3 adjacent the plate 9, and each opening 7 is enclosed by a hinged closure 10. As the retort rotates, the closure 10 which is located along the bottom of the retort will fall by gravity to an open position to thereby permit the treated scrap to be discharged from the opening 7. As rotation continues, the closure 10 will pivot by gravity to the closed position to thereby automatically limit the amount of oxygen introduced into the retort.

The outer shell 1 includes an outer metal housing 11 and a refractory liner 12. The liner 12 is provided with at least one internal circumferential rib 13 which divides the shell into a pair of heating zones 14 and 15. While the drawings show a single rib 13 to divide the housing into a pair of zones, it is contemplated that any number of ribs can be employed to divide the shell into a series of heating zones, depending on the materials being treated.

The retort 3 is mounted for rotation about its axis on two pair of rollers 16 which are journalled in channels 17 mounted on the frame 2.

To rotate the retort 3, a sprocket 18 is secured to the inlet end 4 of the retort and is connected by a chain 19 to a drive sprocket 20. Sprocket 20 is driven by a motor 21 acting through a conventional speed reducing transmission 22. With this drive system, the retort will be rotated slowly about its axis, and as the retort rotates the scrap is lifted and agitated by a series of longitudinal bars 23 secured to the inner wall of the retort. Alternately, a spiral flight can be used in place of the bars 23.

Figure 3:
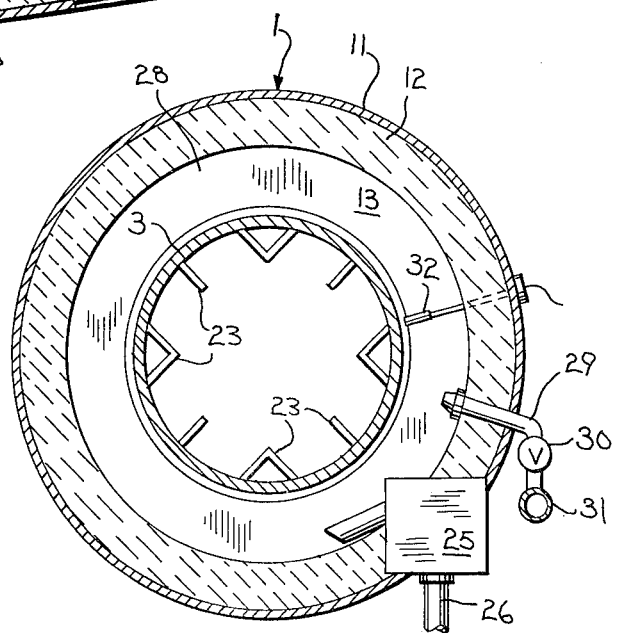
FIG. 3 is a section taken along line 3—3 of FIG. 1.

To heat the metal scrap being conveyed within the retort 3, a pair of gas burners 25 are located within each of the zones 14 and 15. The burners are of the conventional type, and the gas fuel and air are supplied to each burner through lines 26 and 27, respectively. The outlet of each burner 25 extends generally tangentially of the furnace wall, as shown in FIG. 3.

The apparatus of the invention is designed to provide controlled partial combustion of the combustible material, such as oil, coated on the metal scrap. With this system, a self-supporting flame is maintained in a portion of the length of the retort and it is necessary to exercise close temperature control within the retort in order to prevent oxidation, fusing or melting of the scrap material. The oil or other combustible material will burn as the scrap moves through the retort and this heat of combustion, in addition to the heat provided by the burners 25, if not controlled, could raise the temperature of the scrap to a point where fusing, melting or oxidation could occur.

In accordance with the invention the temperature of the scrap in the retort is maintained within a pre-set range by introducing air into the space 28 beteen the shell 1 and the retort 3 when the temperature of the scrap reaches a pre-set maximum. To provide this cooling, a series of conduits 29 extend through the wall of the shell into each zone 14 and 15 and are connected to a suitable source of air under pressure. The flow of air within each line 29 is controlled by a valve 30. The air conduits 29 are connected to a manifold 31 which communicates with a source of air under pressure.

To sense the temperature of the scrap metal within each zone 14 and 15, a thermocouple 32 is mounted in each zone in close proximity to the outer wall of the retort 3. The thermocouple 32 in each zone is operably connected to the burners 25, as well as to the valves 30, in that zone. When the temperature exceeds a preset maximum, the thermocouple will operate to open the valves 30 to admit air into the space or chamber 28 to cool the scrap in the retort. When the temperature in the zone falls below a pre-set minimum, the thermocouple will operate to actuate the gas burners 25 of that zone to heat the retort and the scrap metal. With this arrangement, the burners 25 of each zone will be operated when the temperature is below the pre-set minimum, and the cooling air will be impinged against the retort when the temperature is above the pre-set maximum, and neither heating, nor cooling will be supplied when the temperature is between the limits.

Suitable vents 33 are provided in the shell 1 to exhaust the combustion gases from burners 25 and air from the clearance or chamber 28.

In operation, the scrap material containing oil or other combustible contaninants is fed by feeder 6 into the upper inlet end 4 of the retort. The scrap is progressively tumbled through the retort by operation of the bars 23.

As the scrap moves through the upstream zone 14, the retort will be heated by the gas burners 25 and the scrap will be heated by conduction and radiation from the retort. The combustible material, as well an any water or moisture associated with the scrap, will be vaporized and a portion of the combustible vapor will be burned in the zone 14 so that a flame is visible, while the uncombusted portion of the vapor will pass outwardly through the hood 5 and through conduit 34 to a suitable cyclone separator and afterburner, not shown, where the combustible gases will be completely burned.

As previously noted, if the temperature in zone 14 rises above the maximum preset limit, air will be introduced through the lines 29 to cool the retort and metal scrap.

As the scrap progresses to zone 15, the temperature of the scrap will be maintained within the preset range through operation of the gas burners and cooling air supply.

The temperature limits can be the same in zones 14 and 15 or they can differ considerably, perhaps 50° F. to 500° F., depending on the nature of material being treated, the nature of the combustible contaminant, the exit temperature desired, and the degree of oxidation permitted. In some cases, the temperature range in the downstream zone 15 will be less than the temperature range of the upstream zone 14, while in other situations, where a high exit temperature is desired for hot briquetting of the metal scrap, the temperature range in the downstream zone 15 may be higher than that in zone 14.

While the above description has shown the use of the apparatus for removing combustible material, such as oil, from metal scrap, it is contemplated that the invention can be used to remove various types of combustible materials from non-combustible substances, as for example, removing paint, rubber, hydrocarbons, and plastic materials from metal, removing plastic liners from aluminum bottle caps, removal of resin from foundry sand, and the like, The preferred embodiment has illustrated the use of an inclined retort with the material to be treated being introduced into the high end of the retort and discharged from the low end. In certain applications, however, the material flow can be reversed with the material being fed to the low end and discharged from the high end.

The invention also comtemplates the use of heating means, other than the illustrated gas fired burners. Various types of heating can be used, including oil fired heating, electrical heating and the like.

Various modes of carrying out the invention are contemplated as being within the scope of the following claims particularly pointing out and distinctly claiming the subject matter which is regarded as the invention.

We claim:

1. An apparatus for removing a combustible contaminant from metal scrap, comprising an inclined rotatable retort, feeding means for feeding the metal scrap containing the combustible contaminant into the upper end of the retort, discharge means for discharging the treated scrap after removal of the contaminant from the lower end of the retort, an outer housing spaced outwardly of the retort to provide an annular chamber therebetween, and including a refractory lining extending substantially the full length of the housing, said chamber being divided into a plurality of separate longitudinally disposed zones, fuel burner means disposed in each zone for burning a fuel to thereby heat the retort and the scrap moving therethrough, air conduit means providing communication between each zone and a source of air under pressure, valve means in said air conduit means, a thermocouple in each zone and disposed in proximate relation to the outer surface of the retort to sense the temperature of said retort and the scrap therein, the thermocouple in each zone being operably connected to said burner means and to said valve means of that zone whereby the thermocouple will operate to actuate the burner means when the temperature falls below a preset minimum value and said thermocouple will operate to open said valve means when the temperature exceeds a pre-set maximum.

2. The apparatus of claim 1, wherein the axis of said air conduit means is disposed radially of said retort whereby the air introduced through said air conduit means impinges directly against the surface of the retort.

3. The apparatus of claim 1, wherein said housing is provided with an internal circumferential rib which divides said chamber into said zones.

4. The apparatus of claim 3, wherein said rib is formed of refractory material.

5. A method of removing combustible substances from metal scrap, comprising the steps of providing a series of longitudinally spaced separate refractory lined chambers around the outer surface of an inclined rotatable retort, feeding scrap containing a combustible substance into the upper end of the retort, discharging the metal scrap from the lower end of the retort after removal of the combustible substance, sensing the temperature in each of said chambers, separately heating the portions of the retort within each of the chambers to volatilize the combustible substance when the temperature in that chamber is below a pre-set minimum, and impinging a cooling gas directly against the outer surface of the retort in each chamber when the temperature in that chamber is above a preset maximum, whereby the temperature of the metal scrap will be maintained within a predetermined range in each of said chambers.

* * * * *